No. 850,387. PATENTED APR. 16, 1907.
A. C. MATHER.
PNEUMATIC SPRING.
APPLICATION FILED AUG. 22, 1906.

WITNESSES:
Jas. C. Wobensmith
Theo. Rosemann

INVENTOR
Alonzo C. Mather
By F. DeWitt Goodwin
Attorney

UNITED STATES PATENT OFFICE.

ALONZO C. MATHER, OF CHICAGO, ILLINOIS.

PNEUMATIC SPRING.

No. 850,387.  Specification of Letters Patent.  Patented April 16, 1907.

Application filed August 22, 1906. Serial No. 331,572.

*To all whom it may concern:*

Be it known that I, ALONZO C. MATHER, a citizen of the United States, residing at Chicago, in the county of Cook and State of Illinois, have invented certain new and useful Improvements in Pneumatic Springs, of which the following is a specification.

My invention relates to improvements in a pneumatic spring for vehicles, and is particularly adapted for railway-cars.

The object of my invention is to make certain improvements in the construction of parts for holding the pneumatic spring and for attaching the same to the car-body and the truck.

A further object of my invention is to provide coil-springs to take the weight of the car-body in case the pneumatic spring should collapse.

Figure 1:
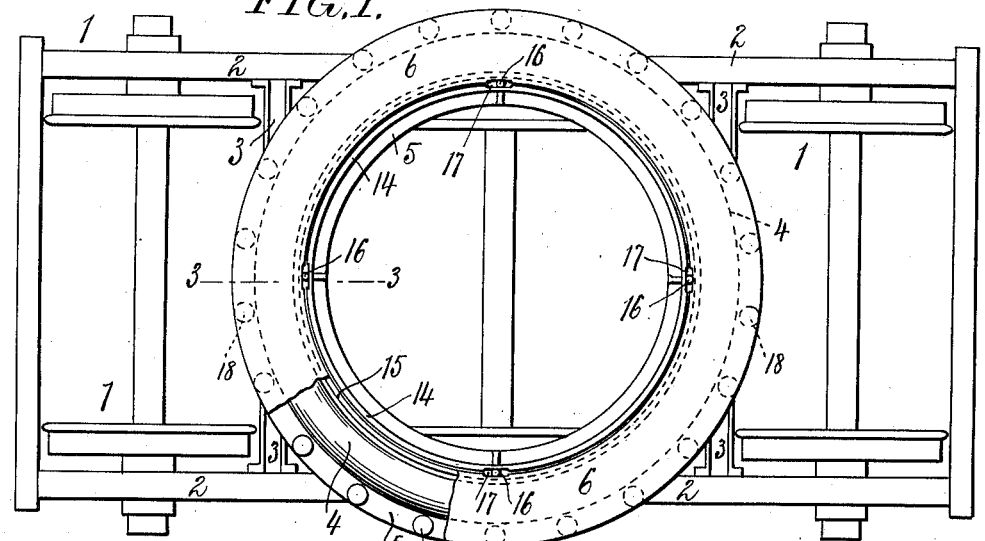
Figure 2:
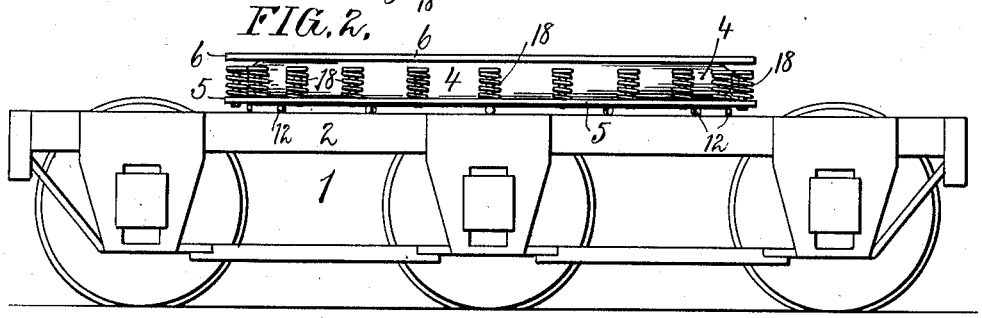
Figure 3:
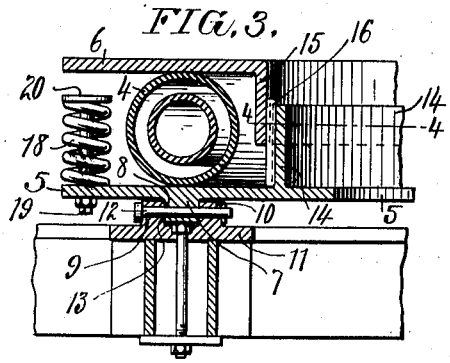
Figure 4:
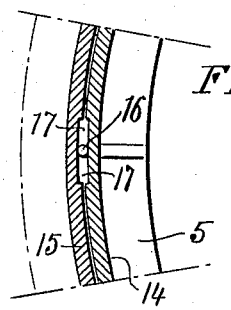

Referring to the drawings, Figure 1 is a sectional plan view taken below the car-body and showing my pneumatic spring attached to the truck. Fig. 2 is a side elevation of Fig. 1. Fig. 3 is a vertical section as on line 3 3, Fig. 1. Fig. 4 is a horizontal sectional view as on line 4 4, Fig. 3.

In the drawings, 1 represents the truck of a railway-car, having sills 2 and cross-pieces 3. The pneumatic spring 4 consists of a flexible tube made of rubber or any other flexible material. An inner tube may or may not be used, as desired. The pneumatic spring 4 is an endless circular tube which rests upon a disk 5, mounted on the truck. Upon said pneumatic spring rests an angle-plate 6, secured to the car-body, which is not shown in the drawings. The disk 5 and the angle-plate 6 are circular in form and are mounted concentric with the king-bolt of the truck.

The disk 5 is provided with an annular rib 7, which fits into an annular groove 8, formed by the projecting ribs 9 and 10 on the plate 11, which is circular in form and is bolted to the truck. Bolts 12 extend through the projecting ribs 9 and 10, in which the said bolts are loosely mounted, so that they act as rollers to relieve the friction between the disk 5 and the plate 11 on the truck. The said bolts pass through elongated slots 13 in the rib 7, projecting from the disk 5, and allow the disk 5 to turn.

The disk 5 is provided with a vertical rib 14, which forms a cylinder, around the outside of which fits the depending rib 15, forming part of the angle-plate 6. The angle-plate 6 is thus held in its proper position.

To permit of a slight rotary movement between the angle-plate and the cylindrical rib 14, I provide rollers 16 to relieve the friction between said parts. These rollers stand vertically and travel in short spaces 17, formed by cutting recesses or depressions in both the cylindrical rib 14 and the depending plate 15, as shown in Figs. 1 and 4.

The disk 5 is provided with a series of coil-springs 18, which are shorter than the diameter of the pneumatic spring 4, so that they will not contact with the angle-plate 6 unless the pneumatic spring should collapse, in which case the weight of the car will be carried by the coil-springs. The said coil-springs are held in place upon the disk 5 by bolts 19, having large flat heads 20. The said bolts work loosely in apertures in the disk 5, so that the spring may be contracted.

By constructing the parts in the above manner the body of the car and the truck are held securely together and cannot get out of place. The rollers between the disk on the truck and the angle-plate 6 on the car will relieve the car of the lateral vibration of the truck, while the pneumatic spring will relieve the car of all other vibration and jolting.

Having thus described my invention, I claim and desire to secure by Letters Patent—

1. The combination of a pneumatic spring, an angle-plate resting upon said pneumatic spring, a disk supporting said pneumatic spring, a cylindrical flange on said disk engaging a depending flange on said angle-plate, and means for interposing said parts between the body and truck of a car, substantially as described.

2. The combination of a pneumatic spring, an angle-plate resting upon said pneumatic spring, a disk supporting said pneumatic spring, a cylindrical flange on said disk, a depending flange fitting around said cylindrical flange, rollers mounted between said cylindrical flange and said depending disk and means for interposing said parts between the body and truck of a car, substantially as described.

3. The combination of a pneumatic spring, an angle-plate above said spring carrying the body of a car, a disk below the said pneumatic spring secured to the truck, and coil-springs to separate said angle-plate and said disk, substantially as described.

4. The combination of a pneumatic spring, an angle-plate above said pneumatic spring adapted to be secured to the body of a car, a depending flange on said angle-plate, a disk below said pneumatic spring, means for securing said disk to the truck of a car, a cylindrical rib on said disk around which fits the said depending flange, rollers located between said depending flange and said cylindrical rib, coil-springs, and bolts to secure the same to said disk, substantially as described.

In testimony whereof I affix my signature in presence of two witnesses.

ALONZO C. MATHER.

Witnesses:
HERBERT H. BARNES,
A. B. MATHER.